Figure 1:
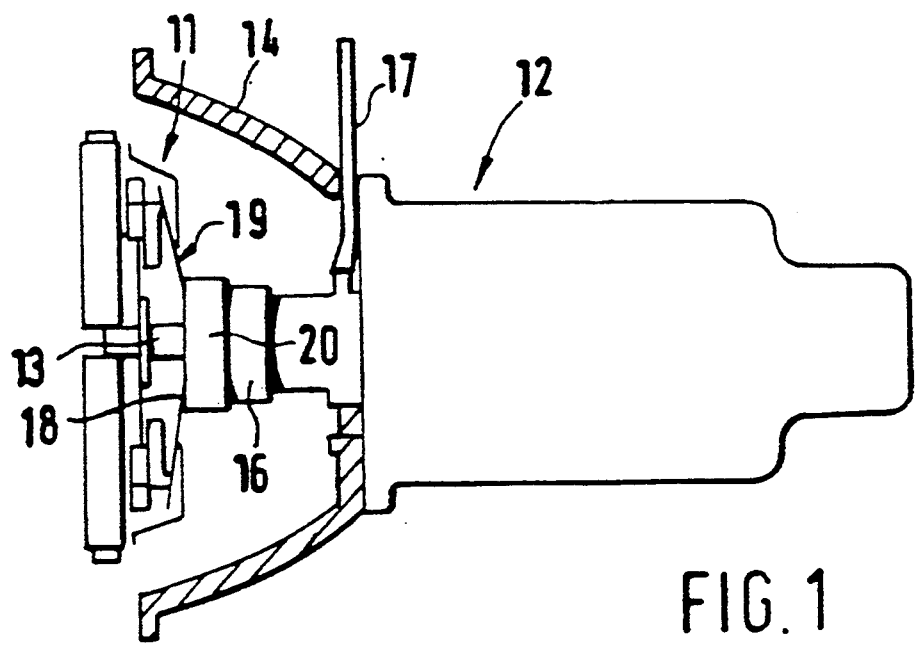

United States Patent [19]

Kopacin

[11] Patent Number: 5,400,886
[45] Date of Patent: Mar. 28, 1995

[54] CLUTCH SLAVE CYLINDER

[75] Inventor: Boris Kopacin, Nanterre, France

[73] Assignee: Automotive Products France SA, France

[21] Appl. No.: 150,221

[22] Filed: Nov. 10, 1993

[30] Foreign Application Priority Data

Nov. 10, 1992 [FR] France ................ 92 13721

[51] Int. Cl.⁶ ................. F16D 25/08; F16D 23/14
[52] U.S. Cl. .................. 192/85 CA; 92/135; 92/165 PR; 192/91 A; 192/98
[58] Field of Search ............ 192/85 CA, 91 A, 98, 192/110 B; 92/135, 165 PR, DIG. 1

[56] References Cited

U.S. PATENT DOCUMENTS

| | | | |
|---|---|---|---|
| 4,585,109 | 4/1986 | Shirley et al. | 192/91 A X |
| 4,660,702 | 4/1987 | Flotow | 192/91 A X |
| 4,708,228 | 11/1987 | Leigh-Monstevens | 192/85 CA |
| 4,869,355 | 9/1989 | Corral et al. | 192/85 CA X |
| 4,913,276 | 4/1990 | Hayashi et al. | 192/85 CA |
| 5,287,951 | 2/1994 | Voit et al. | 192/85 CA |
| 5,307,915 | 5/1994 | Grosspietsch et al. | 192/85 CA X |

FOREIGN PATENT DOCUMENTS 1255002 11/1971 United Kingdom ............ 192/91 A

Primary Examiner—Rodney H. Bonck
Attorney, Agent, or Firm—Paul E. Milliken; Lee A. Germain

[57] ABSTRACT

A hydraulic clutch slave cylinder (16) for a motor vehicle clutch comprising an annular body (21) having inner and outer cylindrical walls (22,23) defining a annular bore (40) therebetween, and a piston (31) having annular portion (32) sealingly slideable in the annular bore (40), an outer portion (34) concentric with the inner portion and telescopically co-extensive with the outer cylindrical wall (23). The radially outer portion (34) of the piston has a radially outwardly extending flange (37) at its end away from the mouth of the bore, which in use engages a clutch release bearing assembly (20) which surrounds the piston and annular bore (40) in the retracted condition of the cylinder.

9 Claims, 2 Drawing Sheets

CLUTCH SLAVE CYLINDER

This invention relates annular slave cylinder for use with motor vehicle clutch actuation systems.

Motor vehicle transmission frequently comprise a clutch and a gear box whose input shaft is driven through the clutch so that the drive of the gearbox can be broken by operation of a hydraulically operable slave cylinder. It has become more common for the slave cylinder to be an annular slave cylinder arranged concentrically of the gear box input shaft.

The concentric slave cylinder is frequently fixed to a face of the gearbox housing within the confines of the gearbox bell housing. Due to dimensional limitations it is becoming necessary for the concentric slave cylinder to become more compact.

According to the invention there is provided a hydraulic clutch slave cylinder a hydraulic clutch slave cylinder for a motor vehicle clutch comprising an annular body having inner and outer cylindrical walls defining an annular bore therebetween and a piston having a radially inner portion slideable in said bore and a radially outer portion concentric with the inner portion and telescopically co-extensive with the outer cylindrical wall and having a radially outwardly extending flange which engages a clutch release bearing assembly, said release bearing assembly being located radially outboard of said outer portion of the piston so that the bearing surrounds the piston and annular bore in the retracted condition of the cylinder.

Preferably a first seal is arranged in the outer wall of the bore adjacent the mouth thereof for engagement with the piston, and a second seal is arranged on the radially inner surface of the piston for engagement with the inner surface of the bore.

Preferably the inner portion of the piston and the outer portion of the piston are formed as separate components, the inner portion having a radially inwardly projecting annular flange at one end thereof and the outer portion having a radially inwardly projecting flange at its one end thereof which overlaps said inner portion flange, and the two pistons are joined together through the flanges.

Figure 2:
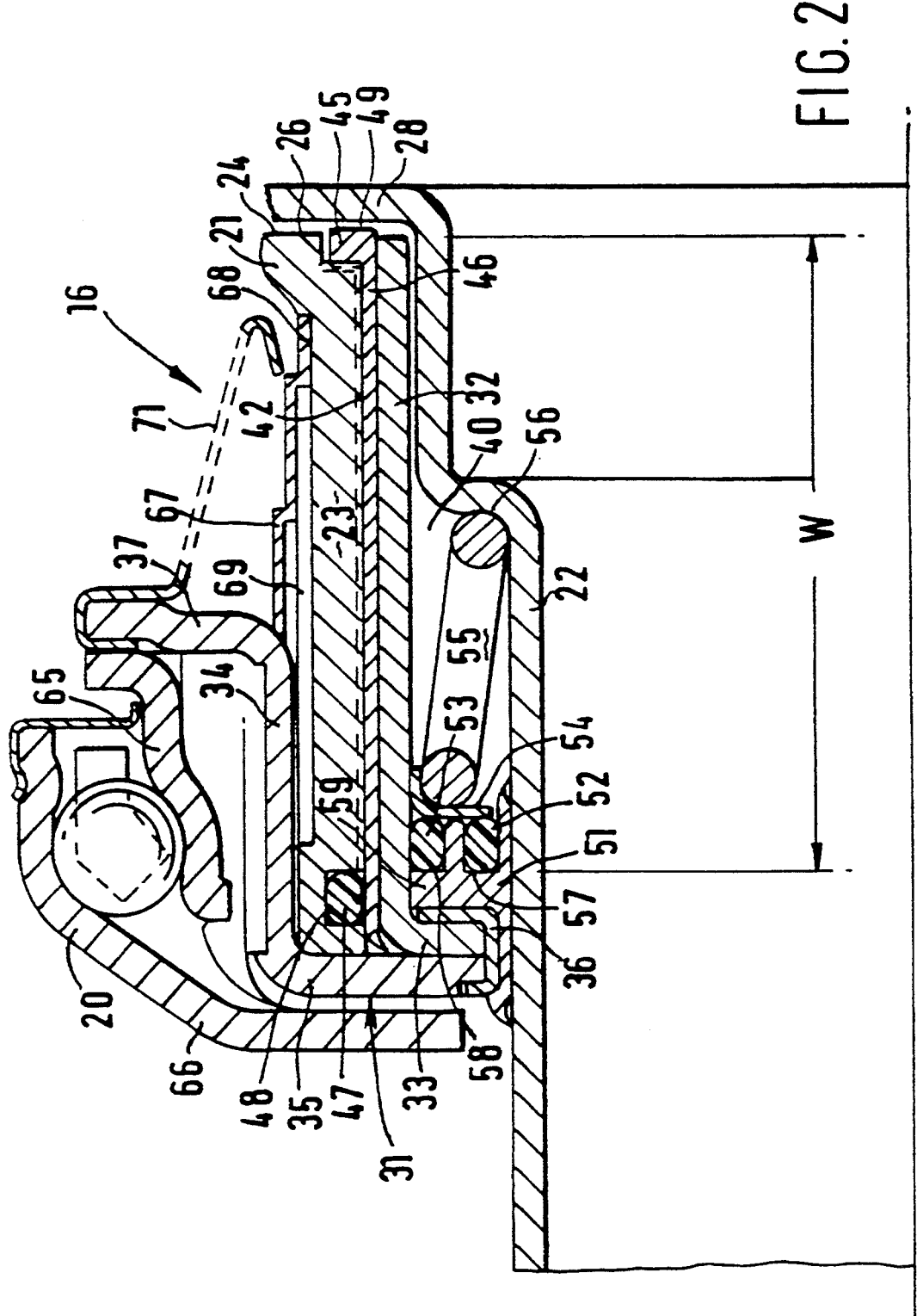

The invention will be described by way of example and with reference to the following drawings in which:

FIG. 1 is a schematic drawing showing a gearbox and clutch assembly for a transmission, and FIG. 2 is a longitudinal cross section through a slave cylinder and release bearing assembly according to the invention.

Now with reference to FIG. 1, a motor vehicle transmission includes a friction clutch 11, and a gear box assembly 12. The gearbox assembly 12 has an input shaft 13 driven by the clutch 11, and a bell housing 14 which houses the clutch and which in use is bolted against a face of an internal combustion engine (not shown).

The clutch 11 is operated by an annular hydraulic clutch slave cylinder 16 arranged concentrically with the gearbox input shaft 13 and in use engages the radially inner ends of the fingers 18 of a diaphragm spring 19 via a clutch release bearing 20. The slave cylinder 16 is operated by hydraulic fluid pressure generated by a master cylinder (not shown) which is connected to the slave cylinder 16 by conduit 17.

Now with reference to FIG. 2, there is illustrated a clutch release mechanism comprising the annular clutch slave cylinder 16 and the release bearing 20 mounted on the slave cylinder 16. The slave cylinder 16 has an annular body 21 having an inner cylindrical wall 22 and an outer cylindrical wall 23 spaced radially outwardly thereof to form an annular fluid bore 40 therebetween. The inner wall 22 extends axially beyond the outer wall 23. The body 21 is formed as two parts, an outer part including the outer wall 23 is formed from cast aluminium or moulded plastic material (such as glass filled nylon 66) and has a radially outwardly extending flange 24 at its end adjacent the gear box, and an inner part including the inner wall 22 is an annular sheet metal pressing having a radially outwardly extending flange 28 at its end adjacent the gear box. The two parts are assembled together with the flanges 24,28 held in contact with a seal therebetween to form a fluid tight bore 40.

A fluid inlet passageway 26 is provided between the flanges 24 and 28 for fluid flow into and out of the bore 40.

An annular piston 31 is sealingly slideable in the bore 40 and comprises an inner cylindrical portion 32 with a radially inwardly projecting flange 33 at the axially outer end thereof, and an outer cylindrical portion 34 which is concentric with the inner portion 32 and also has a radially inwardly projecting flange 35 at its axially outer end, the two portions being secured together by an annular clip 36 on the inner peripheral edges of the flanges 33,35. The inner portion 32 is reciprocal within the bore 40 and is guided for axial movement on the radially inner surface of the outer cylindrical wall 23 and is sealed thereto by a plastic sealing sleeve 46 mounted within the outer wall 23. The portion of the sleeve 46 adjacent the mouth of the bore 40 is resiliently biased against the outer surface inner portion 32 of the piston by an elastomeric ring 47. The elastomeric ring 47 is held in a groove 48 in the radially inner surface of the outer wall 23 adjacent the mouth of the annular bore 40. A fluid passageway (42) is formed in the outer wall 23 so that the elastomeric ring 47 is always wet and under pressure. The end of the sleeve away from the mouth has an annular rib 45 formed thereon which is trapped between the flanges 24, 28 to hold the sleeve in position. Radial fluid passageways 49 are formed in the rib 45, and at least one passageway 49 interconnects with the longitudinal fluid passageway (42).

The two flanges 33, 35 sealingly slide on the radially outer surface of the inner wall 22 through a bearing ring 51 mounted on the radially inner edge of the flange 33. The bearing ring 51 has a radially outwardly extending flange 59 which sits against the flange 33. The ring 51 is biased against the inner wall by two concentric annular elastomeric rings 52 and 53 which are located in recesses 57, 58, in the back face of the flange 59. The elastomeric rings are held in place by an annular retainer ring 54.

The piston 31 is biased away from the flanges 24, 28 by a concentric spring 55, housed in the annular bore 40 formed between the two cylindrical walls 22,23 and acting between the retainer ring 54 and a shoulder 56 formed on the inner wall 22. The spring 55 biases the retainer 54 against the back face of the bearing ring 51 to hold the elastomeric ring in position.

The outer portion 34 of the piston 31 is telescopically coextensive with the outer wall 23 of the cylinder body, and at its end away from the flange 35 has a second annular flange 37 which projects radially outwardly.

The annular bearing 20 is secured concentrically to the piston 31 with its stationary bearing race 65 fixed to the outer portion 34 of the piston 31 by any suitable means such as, adhesive, an interference fit, elastomeric bush or resilient spring clip. The rotary race 66 carries an intermediate annular plate that abuts the inner ends of the spring fingers of the diaphragm spring 19.

The outer portion 34 is rotationally fixed to at least one anti-rotation device 67 which is axially slidable on the radially outer surface of the outer wall 23 of the cylinder and has a lug 68 which engages in an axially extending groove 69 to prevent rotation of the piston 31 relative to the cylinder 16.

Shipping straps 71 are fixed to the outer peripheral edge of the flange 37, and the face ends of the straps engage the outer surface of the anti-rotation device to hold the piston in its cylinder during shipment, storage, and assembly on the vehicle.

In use, a master cylinder generated hydraulic pressure enters the bore 40 of the slave cylinder 16 through passageways 26 and 49 and urges the piston 31 axially away from the end flanges 24, 28 to apply a release load to the diaphragm spring 19 via release bearing 20.

The working travel w of the piston 31 is shown in FIG. 2 and during the travel of the piston in the direction to release the clutch, the straps 71 will pull the anti-rotation device with the piston.

The slave cylinder 16 may form part of a prefilled clutch hydraulic actuation system as described in EP-A-0146 283.

I claim:

1. A hydraulic clutch slave cylinder for a motor vehicle clutch comprising an annular body having inner and outer cylindrical walls defining an annular bore therebetween and a piston having a radially inner portion slideable in said bore and a radially outer portion concentric with the inner portion and telescopically coextensive with the outer cylindrical wall and having a radially outwardly extending flange which engages a clutch release bearing assembly, said release bearing assembly being located radially outboard of said outer portion of the piston so that the bearing surrounds the piston and annular bore in the retracted condition of the cylinder.

2. A hydraulic clutch slave cylinder as claimed in claim 1 wherein there is a first seal arranged in the outer wall of the bore adjacent the mouth thereof for engagement with the piston, and a second seal arranged on radially inner surface of the piston for engagement with the inner wall of the bore.

3. A hydraulic clutch slave cylinder as claimed in claim 2, wherein the first seal comprises an elastomeric sealing ring housed in an annular groove in the outer wall, and a plastic sleeve located radially between the elastomeric ring and the piston and extending substantially the full length of the bore.

4. A hydraulic clutch slave cylinder as claimed in claim 2 wherein the second seal comprises an annular plastic bearing ring fixed to the piston and resiliently biased against the inner wall by an elastomeric ring means.

5. A hydraulic clutch slave cylinder as claimed in claim 4 wherein the piston has a radially inwardly extending piston flange means and the plastic bearing ring has a radially outwardly extending bearing ring flange having a front face that abuts the piston flange means, and the bearing ring flange having a back face containing at least one groove which houses the elastomeric ring means.

6. A hydraulic clutch slave cylinder as claimed in claim 1 wherein the inner portion of the piston and the outer portion of the piston are formed as separate components, the inner portion having a radially inwardly projecting an annular flange at one end thereof, and the outer portion having a radially inwardly projecting flange at its one end thereof which overlaps said inner portion flange, and the two portions are joined together through the flanges.

7. A hydraulic clutch slave cylinder as claimed in claim 1 wherein the radially inner wall of cylinder is formed with an internal annular abutment thereon against which a piston pre-load spring reacts.

8. A hydraulic clutch slave cylinder as claimed in claim 1 wherein the radially outer portion of the piston is rotationally fixed to at least one anti-rotation device which is axially slidable relative to the cylinder body but is rotationally fast therewith.

9. A hydraulic clutch slave cylinder as claimed in claim 8, wherein the anti-rotation device is connected to the piston by straps fixed to the piston and that serve to pull the anti-rotation device in one direction of travel of the piston.

* * * * *